United States Patent [19]

Maida

[11] 4,353,633
[45] Oct. 12, 1982

[54] CAMERA WITH MOTOR DRIVE DEVICE

[75] Inventor: Osamu Maida, Tokyo, Japan

[73] Assignee: Nippon Kogaku K.K., Tokyo, Japan

[21] Appl. No.: 244,288

[22] Filed: Mar. 16, 1981

[30] Foreign Application Priority Data

Mar. 22, 1980 [JP] Japan .................................. 55-35747

[51] Int. Cl.³ .......................... G03B 1/18; G03B 17/38
[52] U.S. Cl. ...................................... 354/173; 354/266
[58] Field of Search ...................... 354/171, 173, 60 R, 354/204–206, 212, 213, 266–268

[56] References Cited

U.S. PATENT DOCUMENTS 4,084,169  4/1978  Iwata et al. .......................... 354/206
4,091,395  5/1978  Kozuki et al. ........................ 354/173

Primary Examiner—L. T. Hix
Assistant Examiner—William B. Perkey

Attorney, Agent, or Firm—Fitzpatrick, Cella, Harper & Scinto

[57] ABSTRACT

A motor drive device to be coupled with a camera for driving a film advancing mechanism thereof. Each of said camera and motor drive device is provided with an electric control device and a power supply circuit for power supply to the electric control device. The camera is provided with a power supply control circuit for controlling power supply from the power supply circuit of the camera to the electric control device of the camera. The power supply control circuit is adapted to receive power supply from the power supply circuit of the camera with the motor drive device. The motor drive device has means for controlling the power supply from the power supply circuit of the motor drive device in synchronization with the control function of the power supply control circuit upon electric connection with the camera.

24 Claims, 4 Drawing Figures

CAMERA WITH MOTOR DRIVE DEVICE

BACKGROUND OF THE INVENTION

1. Field of the Invention

The present invention relates to a camera to be powered, when attached to a motor drive device, by the power source for said motor drive device.

2. Description of the Prior Art

There is already known a camera in which a constant voltage circuit is powered, when it is attached to a motor drive device and in response to the actuation of the shutter button, by a power source for driving a motor in said motor drive device, thereby energizing a shutter control solenoid and other components by the output voltage of said circuit. Such camera is advantageous in preventing power loss in the constant voltage circuit since it is powered only when the shutter button is pressed to activate the shutter control solenoid etc. Also there is known the use of an oscillating circuit containing a piezoelectric vibrating element made of quartz or a ceramic material for effecting the control of the shutter solenoid or the sequence control of electromagnetic shutter releasing device by means of the stable specific frequency of such vibrating element. However such oscillating circuit involving the piezoelectric element often has to be continuously powered in a camera requiring critical timing for picture-taking, as such circuit requires a relatively long time to reach a stable oscillation after the start of power supply.

Thus, if the shutter control solenoid and the oscillating circuit are powered by the power source for the motor drive device through a constant voltage circuit to be switched on in response to the actuation of the shutter button, there may result a perturbed shutter control due to the picture-taking operation initiated before the oscillating circuit reaches a stable oscillation, or there may be lost an important picture-taking opportunity because of an excessively long time period before the shutter can be released. On the other hand if the constant voltage circuit is continuously powered to activate the oscillating circuit regardless of the manipulation of the shutter button, there will result a considerable power loss in said constant voltage circuit as it has to be designed to provide a large power for driving the shutter control solenoid etc. In order to avoid these drawbacks the motor drive device can be provided, in addition to the aforementioned constant voltage circuit, with a separate power supply circuit of low power consumption exclusively for continuously driving the oscillating circuit, but such arrangement requires an increased number of terminals for said constant voltage circuit and said separate power supply circuit respectively on the motor drive device and the camera itself, leading to a lowered reliability.

SUMMARY OF THE INVENTION

The object of the present invention is to prevent the above-mentioned drawbacks and to provide a camera with motor drive device, in which the output of a constant voltage circuit of a large power and the output of a power supply circuit of a low power for the oscillating circuit are unitedly supplied to the camera, thereby reducing the number of terminals of the connector between the camera and the motor drive device.

A second object of the present invention is to provide a camera with motor drive device in which a power control circuit of the motor drive device for controlling the constant voltage circuit for power supply to the camera, when it is attached to said motor drive device, is synchronously controlled with a power control circuit in the camera and is adapted to simultaneously control the motor control circuit etc. in said motor drive device, thereby eliminating the main switch in the motor drive device. In a mechanically releasable conventional camera without power supply from the motor drive device, the electric circuit in said motor drive device is activated to control the motor only during the presence of film-advancing signal from the camera, and remains inactive usually without power loss after the termination of said signal. In such case the motor drive device does not essentially require a main switch in said electric circuit. In recent cameras, however, becoming common are the use of so-called electromagnetic shutter and of a so-called half-push timer function by which, in response to a half-push of the shutter button, the camera circuits are powered for a determined period to enable the operator to see the predicted exposure conditions, such as the shutter speed, on a meter or by light-emitting diodes. The power supply to such camera from the motor drive device requires a more complicated circuitry than in the above-mentioned case, and a main switch becomes indispensable for controlling power supply to the motor drive device. Such main switch, however, has to be turned on every time before the use of motor drive device, and, if not turned off after the use, will cause unnecessary exhaustion of the battery by the current consumption in stand-by state. Such drawback can be avoided by the present invention.

A third object of the present invention is to provide a circuit allowing power supply to the camera from the motor drive device in combination with manual film advancing in a state in which the power source of the motor drive device is unable to provide a sufficient voltage for film advancing or in a state of film loading. Stated differently said object is to provide a circuit capable, when the battery voltage is lowered to a value sufficient for driving the camera but insufficient for driving the motor, of interrupting the power supply to the motor but maintaining alone the power supply to the camera from the motor drive device. In such state, if the motor is always activated in response to a film-advancing signal, there will result a current consumption of several amperes at the motor start or several hundred milliamperes during the film advancing, which, being significantly larger than the camera-controlling current of 10–20 mA, will reduce the battery voltage below the operable voltage of the constant voltage circuit for supplying power to the camera, thereby disturbing the picture-taking sequence therein. The above-mentioned object is to prevent such phenomenon and to enable picture-taking with manual film advancing as if in an ordinary camera. Also at the film loading, the operator inserts the leading end of film into the take-up spool of the camera and closes the camera lid after manually confirming the film advancement, but, if the film is taken up at a high speed in this state by the motor drive device, the incompletely inserted film may become free from the revolving take-up spool and cannot therefore be advanced properly. Such difficulty can also be prevented by the present invention.

A fourth object of the present invention is to provide a circuit in which, in a camera satisfying the above-mentioned second object and further capable of automatically terminating the film advancement and indicating the film end by a light-emitting diode when the film end is detected by a torque detector or an end timer, the power supply circuit of the motor drive device remains self-supportedly active to continue to prohibit the motor function and to activate the film and indicator even after the power supply circuit of the camera is automatically cut off by the half-push timer circuit of the camera, and such state can only be cancelled by manual resetting of the motor drive device or by manual selection of rewinding state on the camera. If the film end indicator is automatically deactivated by the half-push timer circuit of the camera, the operator may mistake that the camera still contains usable film and continue the picture-taking operation, thus finding the absence of usable film at the last moment and losing the important picture-taking opportunity. Such inconvenience can also be prevented by the present invention.

A fifth object of the present invention is to provide means for resolving inconveniences in control resulting from minimized number of connector terminals in the use of a remote control unit for the motor drive device.

A related invention is disclosed by the present applicant in the U.S. Patent Application Ser. No. 114,203, filed Jan. 22, 1980, now U.S. Pat. No. 4,329,036, and in the German Patent Application No. P 30 03 294-1.

DESCRIPTION OF THE PREFERRED EMBODIMENTS

Now the present invention will be clarified in detail by an embodiment shown in the attached drawing.

Figure 1:
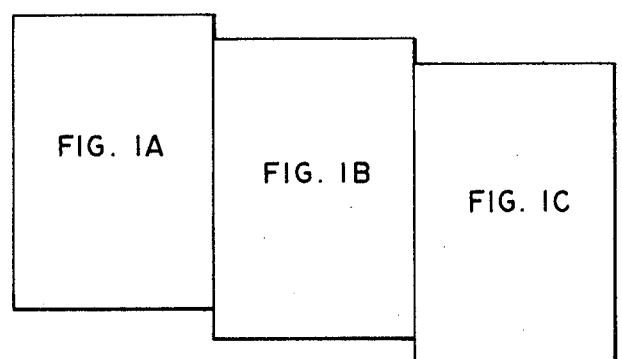
FIG. 1 is a connecting relation of FIGS. 1A, 1B and 1C which show, in combination, a circuit diagram of a camera with motor drive device embodying the present invention.
Figure 1A:
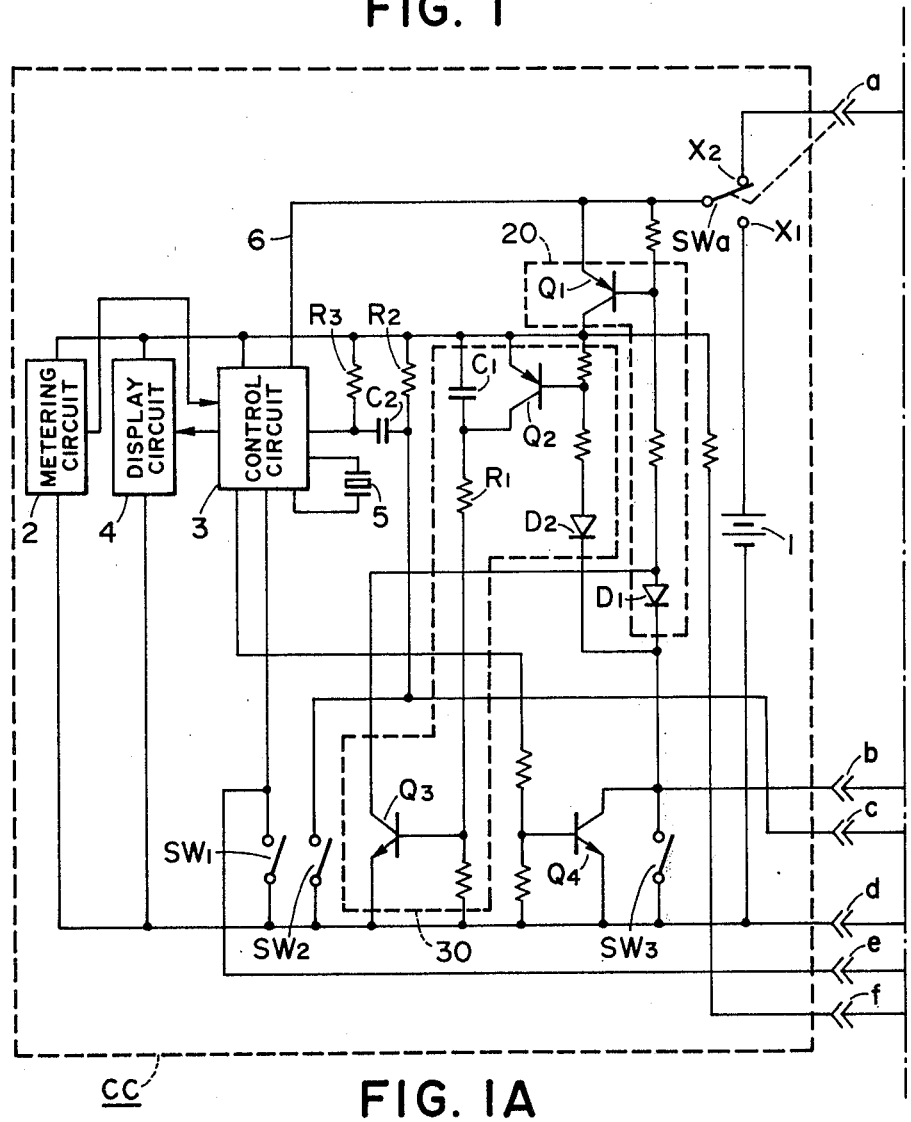
Figure 1B:
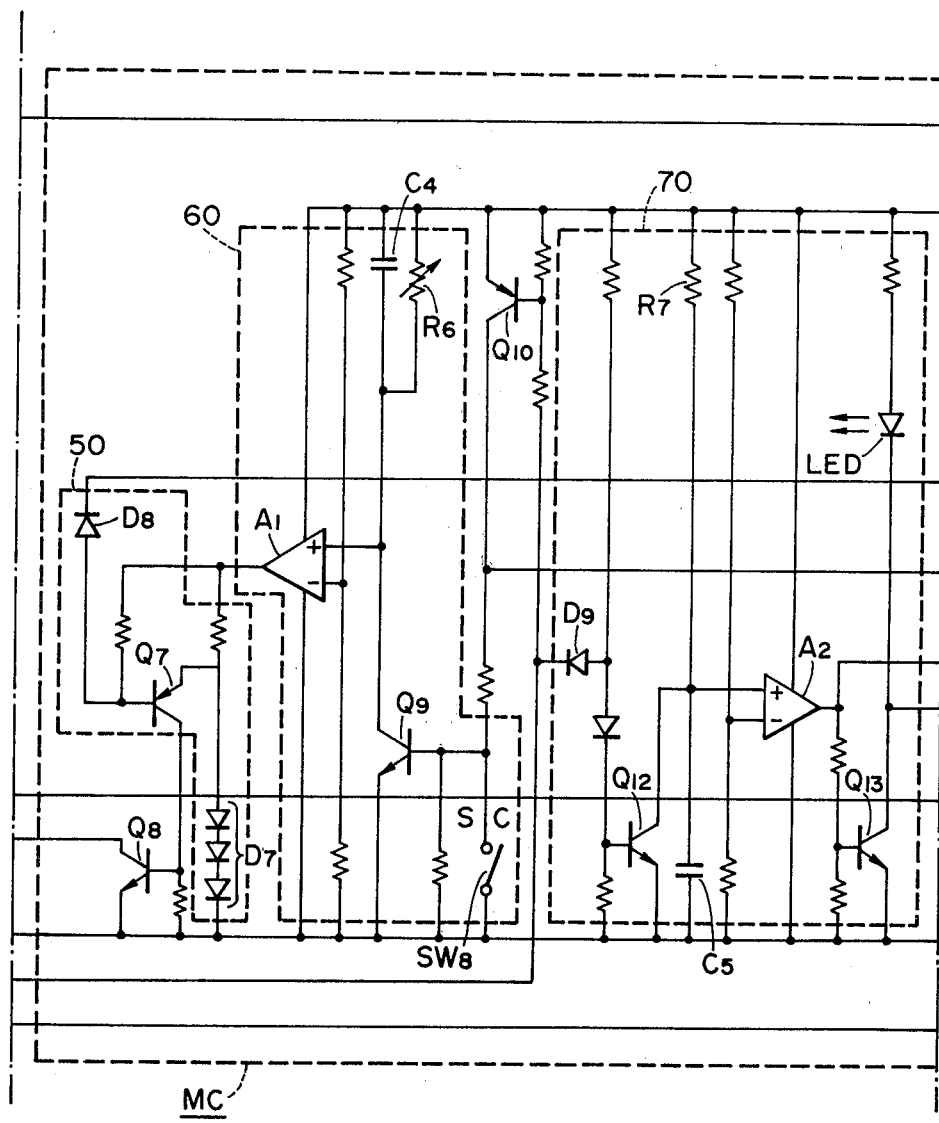
Figure 1C:
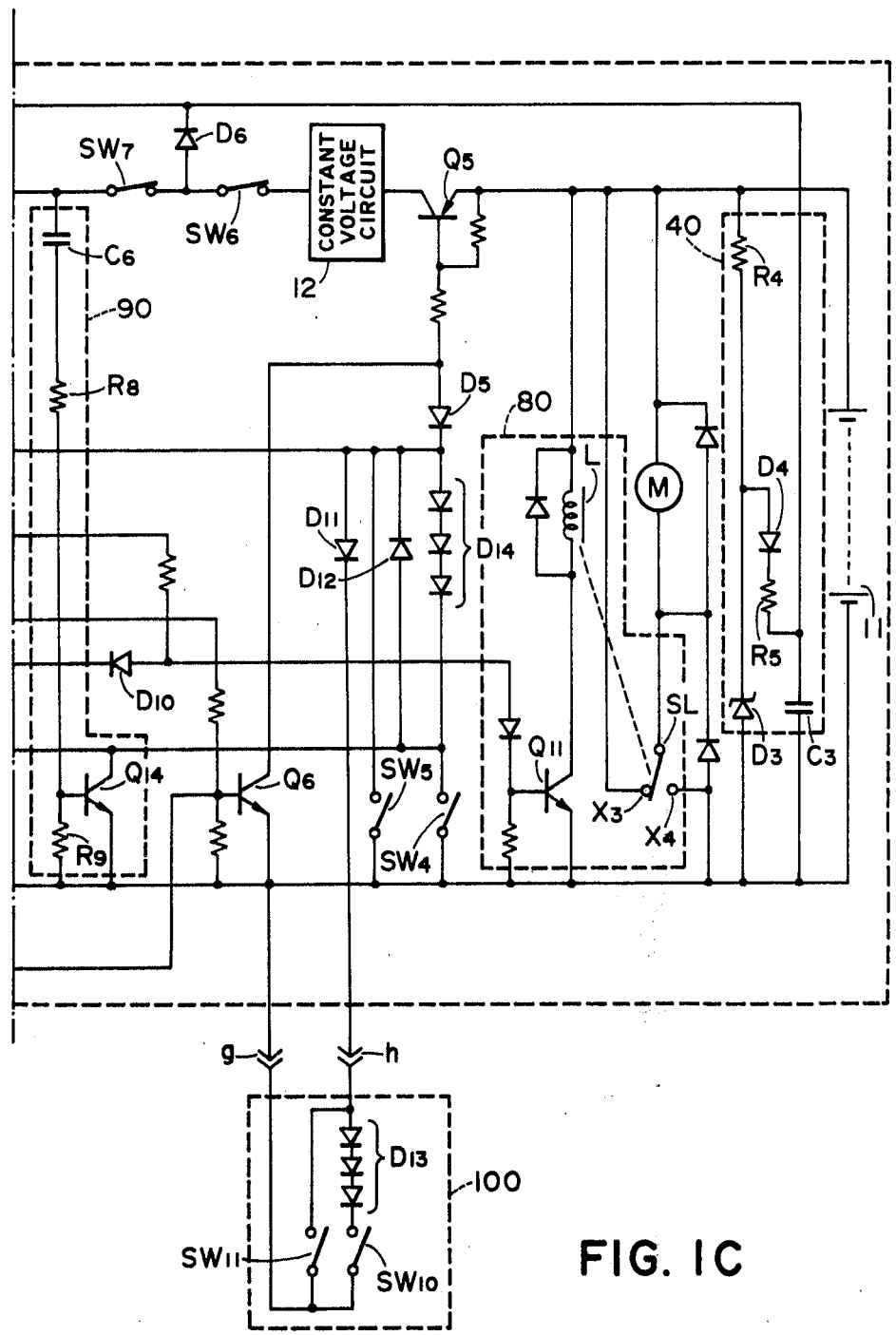

In FIG. 1, a camera circuit CC and a motor drive circuit MC are mutually connected through connector terminals a, b, c, d, e and f.

A power source selector switch SWa is connected to a contact x1 connected to a battery 1 in the camera or to a contact x2 connected to the connector terminal a respectively when the motor drive device is separated from or attached to the camera, whereby said camera circuit CC is powered by the battery 1 of the camera or by a power source 11 of the motor drive device in response to the detachment or attachment thereof. A power supply control circuit 20 of the camera is composed of a transistor Q1, a resistor and a diode D1, while a first timer circuit 30 is composed of transistors Q2, Q3, a diode D2, a condenser C1 and a resistor R1. A switch SW3 and a release switch SW2 are respectively closed in response to a half-push and a full-push of an unrepresented shutter button. If the switch SW3 is closed when the selector switch SWa is connected to the contact x1, the transistors Q1, Q2 and Q3 are turned on whereby the circuits, 2, 3 and 4 in the camera are powered by the battery 1 through said transistor Q1. After the switch SW3 is opened, the transistor Q2 is immediately turned off due to the presence of the diode D1, but the transistors Q1 and Q3 constitute a positive feedback circuit through the condenser C1 to remain in the turned-on state. Thereafter said condenser C1 is charged with a time constant determined by said condenser C1 and resistor R1, and the transistor Q3 is turned off due to the decreasing charging current to also turn off the transistor Q1. In this manner said first timer circuit 30 maintains the power supply to said circuits 2, 3 and 4 for a determined period after the switch SW3 is opened.

A light-metering circuit 2 effects the analog digital conversion of the luminance of an object, and transmits thus obtained luminance information to a control circuit 3, which performs calculation of exposure time and sequence control of unrepresented shutter solenoid, shutter release solenoid, diaphragm solenoid and other necessary components of the camera according to a reference frequency supplied by an oscillating circuit having a piezoelectric vibrating element 5. A display circuit 4 performs digital displays of exposure conditions calculated by said control circuit 3, by means of light-emitting diode or liquid crystal display elements. In response to the closing of the release switch SW2, the control circuit 3 receives a release signal through a differentiating circuit composed of resistors R2, R3 and a condenser C2. A film advancing switch SW1 is closed when the shutter is closed under the exposure control, and is opened upon completion of the film advancing the shutter charging. The closed state of said switch SW1 is transmitted to the control circuit 3, which thus ignores the closed-state signal of the release switch SW2 until said switch SW1 becomes opened. The control circuit 3 maintains a transistor Q4 in turned-on state from the closing of the release switch SW2 until the closing of the film advancing switch SW1 after the completion of exposure in order to avoid premature closing of the shutter, in case the controlled exposure time is longer than the determined time of said first timer circuit, automatically after the lapse of said determined time of the first time if the shutter button is liberated during said exposure time.

The vibrating element 5 in the oscillating circuit of the control circuit 3 is continuously powered by the battery 1 or the power source 11 of the motor drive device through an oscillator power line 6 even after the transistor Q1 of the power supply control circuit 20 is turned off, thereby maintaining a stable oscillation constantly regardless of the state of the switch SW3. The current in said line 6 can be reduced to the order of several microamperes, i.e. smaller than the auto-exhaustion current of the battery if said oscillating circuit is made for example of a CMOS element.

The circuit MC of the motor drive device is driven by the battery 11. A power supply circuit 40 composed of a resistor R4, a Zener diode D3, a diode D4, a resistor R5 and a condenser C3 is provided for continuously energizing the vibrating element 5 of said oscillating circuit in the camera, and supplies power to the camera through the aforementioned switch SWa actuated upon attaching the motor drive device to the camera. The current in said resistor R4 can be selected in the order of several times larger than the current consumed in said oscillating circuit 5. The Zener diode D3 is provided to adapt the voltage of the battery 11 to the operating voltage of the camera, and may satisfactorily be replaced by a stack of several diodes in series or by a resistor. A switch SW4 connected parallel to the camera switch SW3 through the connector terminals b, d and a release switch SW5 in the motor drive device are closed respectively in response to a half-push and a full-push of a shutter release button of the motor drive device, and are both opened when said button is liberated. In response to the closing of said switch SW4, the transistor Q5 of the power supply control circuit is turned on through the diode D5 and a stack of three diodes D14 to supply the voltage from a constant voltage circuit 12 to the camera through a rewinding switch SW6, a diode D6 and the connector terminal a. Simultaneously the transistor Q1 of the camera is turned on through the connector terminal b, thereby allowing the power supply from said constant voltage circuit 12 to the camera circuit CC. Besides, the transistor Q6 is turned on through the connector terminal f, whereby the transistor Q5 remains in turned-on state for a determined period by the first timer circuit 30 of the camera even after the switch SW4 is opened. The functions achieved by closing the switch SW4 are also achievable by closing the switch SW3 of the camera. Actuation of an unrepresented rewinding lever on the motor drive device sets the rewinding button on the camera and simultaneously closes the normally-opened rewinding switch SW6. A switch SW7 is closed in the motor drive mode but becomes open at the film loading or in a state where the battery voltage is insufficient for advancing film at a determined speed or where a manual winding mode is selected. The control circuits for motor drive and shutter release control are activated in the motor drive mode in which the switch SW7 is closed.

The shutter release control circuit is composed of a release detecting circuit 50 and a second timer circuit 60 containing a selector circuit for selecting either continuous shooting or one-frame shooting. Said release detecting circuit 50 is composed of a transistor Q7, a stack of three diodes D7, and a diode D8, wherein said transistor Q7 is turned on only when the release switch SW5 is closed during an H-level output from a comparator A1, thereby turning on a transistor Q8 connected parallel to the release switch SW2 of the camera through the terminals c, d to transmit a release signal to the camera through the connector terminal c. Said release detecting circuit 50 is so structured that the voltage generated at the diode stack D14 at the closing of switch SW4 alone is excessively high for turning on the transistor Q7, which therefore is turned on to provide the release signal only in response to the closing of the release switch SW5. The aforementioned second timer circuit 60 is composed of a comparator A1, a variable resistor R6, a condenser C4, a transistor Q9 and a switch SW8 for selecting continuous exposure or one-frame exposure. In the continuous exposure mode in which the switch SW8 is opened, the closing of the film advancing switch SW1 after the completion of exposure turns on transistors Q10 and Q9 through the connector terminal e to completely charge the condenser C4 connected to the collecter of said transistor Q9, whereby the comparator A1 releases a L-level signal to turn off the transistors Q7, Q8 and to reset the differentiating condenser C2 in the release circuit of the camera. Upon completion of film advancing thereafter, the switch SW1 is opened to turn off the transistors Q10, Q9, whereby the condenser C4 is discharged through the parallel variable resistor R6, thus inverting the comparator A1 after a determined time. If the switch SW5 is closed when the output of said comparator A1 is shifted to H-level, the transistor Q8 is turned on to again provide the release signal, thus resetting the condenser C2 and releasing the shutter. The above-explained procedure is repeated during the closed state of the switch SW5, thus achieving continuous exposure. The interval of exposures can be regulated by said variable resistor R6. In the one-frame exposure mode in which the switch SW8 is closed, the transistor Q9 is not turned on so that the condenser C4 is not charged and the comparator A1 maintains the H-level output. Consequently the transistor Q8 remains in the turned-on state while the switch SW5 is closed, whereby said differentiating condenser C2 of the camera is not reset. In this manner the shutter release does not take place even in the presence of release signal, and has to be effected after the switch SW5 is once opened. Such one-frame exposure mode can also be achieved by pressing the shutter button of the camera.

In the present embodiment, the motor drive control circuit is composed of a third timer circuit 70 and a motor drive circuit 80. Said motor drive circuit 80 is composed of a transistor Q11, a relay coil L and relay contact SL, wherein, upon turning-on of the transistor Q10 in response to a film advancing signal supplied from the switch SW1 in the camera, the transistor Q11 is turned on to energize the relay coil L, thereby shifting the relay contact SL from a contact x3 to x4. In this manner a motor M is driven to effect the film advancement and shutter charging in the camera through unrepresented mechanical links. On the other hand said third timer circuit 70 is composed of a diode D9, transistors Q12, Q13, a comparator A2, a resistor R7, a condenser C5 and a light-emitting diode as film end indicator. After the film advancement the switch SW1 is opened to turn on the transistor Q12 whereby the condenser C5 connected to the collector thereof is in a discharged reset state. Upon receipt of the film advancing signal in response to the closing of said switch SW1, the transistor Q12 is turned off to initiate the integration by the condenser C5. The comparator A2 normally provides an L-level output to turn off the transistor Q13 whereby the display element LED remains extinguished. In the normal film advancing the output of said comparator A2 is not inverted, since the normal film advancing time is shorter than the time of current integration in condenser C5 through the resistor R7 to cause inversion of the output of comparator A2. However at the film end when the film can no longer be pulled out from its magazine, or in case the motor drive becomes very slow due to a lowered voltage of the battery 11, or in case of a mechanical failure in the camera, the film advancement is not completed within the determined time of the third timer circuit 70, whereby the comparator A2 is inverted to provide an H-level output signal to turn on the transistor Q13, thus lighting the display element LED to indicate that the motor M is stopped despite the presence of a film advancing signal. Such display usually appears at the end of a film roll. In such sate the turned-on transistor Q13 causes the by-passing of the bias current for the transistor Q11 through the diode D10 to turn off said transistor Q11, thereby interrupting the current supply to the relay coil L and thus returning the relay contact SL to the position x3 to terminate the motor operation. Also in response to the opening of the switch SW3 or SW4 the first timer circuit 30 becomes operative to turn off the aforementioned transistor Q1 for controlling the power supply in the camera after a determined period, thus terminating the bias current to the transistor Q6 through the terminal f, but said transistor Q6 remains in turned-on state because of the H-level output from the comparator A2. Consequently, when the transistor Q1 of the power supply control circuit 20 is turned automatically off by the first timer circuit 30, the transistor Q5 remains turned on to continue the function of the display element LED, thus avoiding the eventual overlooking of the film end indication.

A condenser C6, resistors R8, R9 and a transistor Q14 constitute an auxiliary circuit 90 for a remote control unit 100 which is connected to the motor drive circuit MC through connector terminals g and h. Said terminal h is connected to the cathode of the diode D5 through a diode D11 which is provided for preventing erroneous function by overlapping source voltages in case of controlling plural motor drive devices with one remote control unit and for allowing to test each motor drive device in such case without the function of other motor drive devices, and which is preferably formed of a diode with a low forward voltage loss such as a Schottky diode. Said remote control unit 100 is provided with two switches SW10, SW11 which are closed in succession by the actuation of an unrepresented release button provided on said unit 100. Said switch SW10 is connected to the remote control terminal h through a stack of three diodes D13 similar to the diode stack D14 in the motor drive device, and said switch SW11 is so connected as to shortcircuit said diode stack D13. In response to the closing of said switch SW10 of the remote control unit, the transistor Q5 is turned on in the aforementioned manner to activate the circuits in the motor drive device. On the other hand the power supply control circuit 20 of the camera has to be triggered by a voltage signal of a level as if the switch SW4 is simultaneously closed, and such signal is supplied from said auxiliary circuit 90. In this state said transistor Q5 is turned on in the aforementioned manner to apply a voltage to the auxiliary circuit 90, whereby the charging current to the condenser C6 turns on the transistor Q14. Consequently the transistor Q1 of the power supply control circuit 20 in the camera is turned on through the terminal b, thus initiating the control by said first timer circuit. As the function of said first timer circuit is initiated when the transistor Q14 is turned off, it is possible to initiate said function automatically at a determined time after the closing of the switch SW10 if the condenser C6 is so selected as to require a sufficiently short charging time. After the lapse of the determined time of said first timer circuit, the transistor Q1 of the power supply control circuit 20 can be reactivated by opening and again closing said switch SW10. As said diode D11 is composed of a Schottky diode, the release detecting circuit 50 is securely activated to trigger the shutter release once the switch SW11 is closed. A diode D12 inverse to diode stack D13 is provided for guiding the bias current to the transistor Q2 of said timer circuit 30 from the connector terminal b to the diode D11 and switch SW11 thereby arresting the function of said timer circuit 30. Said diode D12 functions to avoid an inconvenience, in case the determined time of the second timer circuit 60 is longer than that of the first timer circuit 30, of undesired interruption of continuous exposure by the switch SW11 of the remote control unit 100, caused eventually by a state wherein the transistor Q1 is tuned off by the first timer circuit 30 before the generation of release signal by the transistor Q8 after the lapse of said time determined by C4 and R6. For a securer function of the circuit, the diode D12 is also preferably of a low forward voltage loss and is composed of a Schottky diode.

Picture-taking operation with manual film advancing while the motor drive device is attached to the camera can be achieved by opening the switch SW7. Also in this state the transistor Q5 and the constant voltage circuit 12 of the motor drive device are rendered operable, so that in response to the actuation of the shutter button of the camera, said transistor Q5 is turned on to effect power supply to the camera from the motor drive device.

In this manner, whenever the motor drive device is attached to the camera, the camera circuit CC can be powered by the power source 11 of the motor drive device regardless of whether it is driving the motor or not. Consequently the camera alone can be conveniently powered by opening said switch SW7, in case the battery voltage of the motor drive device is insufficient for the motor drive but is sufficient for driving the camera circuits 2, 3 and 4.

At the end of a film roll the display element LED and the power supply control transistor Q5 continue to the turned on, and this state can be reset by opening either the switch SW7 or the rewinding switch SW6.

In response to the actuation of an unrepresented rewinding selector lever, the rewinding button of the camera is pressed to enable the rewinding operation, and the switch SW6 is simultaneously opened. Thereafter, however, the camera maintains the oscillating circuit in function by the power supply from the power supply circuit 40.

The switch SW7 for manual film advancement is inserted, in the foregoing embodiment, between the constant voltage circuit and the motor drive control circuits 70, 80, but it may also be connected for the same purpose for example in series to the motor and relay coil, or between the connector terminal b and the cathode of diode D9, or in the base drive line for the transistor Q11.

Also said motor control circuits 70, 80 in the foregoing embodiment are powered by the constant voltage circuit, but such arrangement is not essential for the purpose of this invention and a similar function as explained in the foregoing can be obtained by powering the circuits with the output from the collector of the transistor Q5.

Furthermore the switch SW6, which is to be opened at the film rewinding, need not necessarily be in the aforementioned position but can be so positioned as to interrupt the positive feedback of the power supply control circuit 40 and the circuit for lighting the display element LED, for example between the transistor Q5 and the constant voltage circuit 12.

I claim:

1. In a motor drive device to be coupled with a camera for driving a film advancing mechanism thereof, wherein each of said camera and motor drive device is provided with an electric control device and a power supply circuit for power supply to said electric control device, wherein said camera ia provided with a power supply control circuit controlling power supply from said power supply circuit of the camera to said electric control device of the camera, and wherein said power supply control circuit is adapted to receive power supply from said power supply circuit of the motor drive device upon electric connection of said camera with said motor drive device;

an improvement comprising means for controlling the power supply from the power supply circuit of said motor drive device in synchronization with the control function of said power supply control circuit upon electric connection with said camera.

2. A motor drive device according to the claim 1, wherein said control means comprises switch means for effecting simultaneous power supply to said power supply control circuit and the power supply circuit of said motor drive device.

3. A motor drive device according to the claim 2, wherein said power supply control circuit comprises a timer circuit adapted to initiate time measuring upon termination of actuation of said switch means and to maintain power supply said power supply control circuit for a determined time.

4. A motor drive device according to claim 3, wherein said control means comprises response means for effecting power supply during the power supply function of said power supply control circuit and independently from the actuation of said switch means.

5. A motor drive device according to the claim 4, wherein said response means comprises means for detecting the power supply function of said power supply control circuit.

6. A motor drive device according to the claim 1, wherein said camera comprises power source selecting means for connecting said power supply control circuit to said power supply circuit of the motor drive device or to said power supply circuit of the camera respectively when said camera is coupled with or detached from said motor drive device.

7. A motor drive device according to the claim 6, in which the electric control device of said camera is provided with an oscillating circuit containing a piezoelectric element for time control;
wherein said motor drive device further comprises a second power supply circuit having a voltage output necessary for driving said oscillating circuit and adapted to effect power supply to said oscillating circuit at said coupling, independently from the power supply from the power supply circuit of said motor drive device under the control of said control means.

8. A motor drive device according to the claim 7, wherein the power from said second power supply circuit is supplied to said oscillating circuit through said power supply selecting means.

9. A motor drive device according to the claim 8, wherein the power supply circuit and second power supply circuit of said motor drive device respectively comprise inverse current checking means through which power is supplied to said power supply selecting means.

10. A motor drive device according to the claim 1, in which said camera is provided with a device for generating a film advancing signal at the final stage of film exposure operation, and in which the electric control device of said motor drive device is provided with a motor and a motor drive circuit for controlling power supply to said motor;
wherein said electric control device of said motor drive device further comprises delay means adapted to initiate time measurement in synchronization with said film advancing signal and terminating power supply by said motor drive circuit after the lapse of a determined time, and display means for functioning in response to said delay means.

11. A motor drive device according to the claim 10, wherein the electric control device of said motor drive device is so connected to said control means to effect power supply therethrough and further comprises manual switch means for interrupting said connection.

12. A motor drive device according to the claim 10, wherein the electric control device of said motor drive device is so provided as to effect power supply by said control means, and further comprises means for biasing said control means for maintaining the power supply by said control means in response to said delay means.

13. A motor drive device according to the claim 12, further comprising reset means for resetting the power supply of said control means maintained by said biasing means.

14. A motor drive device according to the claim 13, wherein said reset means comprises manually operable switch means provided between said control means and said delay means.

15. In a motor drive device according to the claim 1, in which said camera is provided with a device for generating a film advancing signal at the final stage of film exposure operation, and the electric control device of said motor drive device is provided with a motor and a motor drive circuit for power supply to said motor from the power supply circuit of said motor drive device in response to said film advancing signal;
an improvement further comprising interrupting means for interrupting the power supply to the motor from said motor drive circuit, said interrupting means comprising a timer circuit initiating time measurement in synchronization with said film-advancing signal and being adapted to effect said interruption after the lapse of a determined time from the generation of said film advancing signal.

16. A motor drive device according to the claim 2, further comprising electric terminals connectable to a remote control unit, wherein said terminals are connected to said control means and said remote control unit is adapted generate a remote control signal for activating said control means through said terminals.

17. A motor drive device according to the claim 16, wherein said terminals are provided independently from said switch means in such a manner that the control of said control means by said remote control signal is effected independently from the actuation of said switch means.

18. A motor drive device according to the claim 16, further comprising signal generating means for rendering operable said power supply control circuit of the camera in synchronization with the function of said control means.

19. A motor drive device according to the claim 18, wherein said signal generating means comprises a timer circuit adapted for initiating time measurement in synchronization with the function of said control means and generating a signal for activating the power supply control circuit of said control means for a determined time.

20. A motor drive device according to the claim 18, wherein said remote control unit comprises means for generating plural remote control signals of mutually different voltages; and the electric control device of said motor drive device comprises means for rendering said control means responsive to either one of said plural remote control signals, and means for triggering the shutter release operation of said camera in response to the other of said plural remote control signals.

21. In a motor drive device to be coupled with a camera having an oscillating circuit containing a vibrating element for time control thereby driving a film advancing mechanism of said camera, said motor drive device being provided with first and second connecting terminals for electric connections with said camera, shutter release control means, and a first power supply circuit for providing power supply voltage for driving said camera across said first and second terminals in response to said shutter release control means, an improvement comprising a second power supply circuit having a voltage output necessary for driving the oscillating circuit of said camera and connected between said first and second connecting terminals, said second power supply circuit being adapted to apply a voltage output across said first and second connector terminals independently from the function of said shutter release control means.

22. In a motor drive device according to the claim 21, in which said camera is provided with a power supply circuit for energizing said oscillating circuit;

an improvement wherein said camera further comprises power supply selecting means operable in response to the coupling with said motor drive device, and said selecting means is adapted to connect said oscillating circuit between said first and second terminals or to said power supply circuit respectively when said camera is coupled with or detached from said motor drive device.

23. In a motor drive device to be coupled with a camera having a power supply circuit for power supply to an electric control device of said camera and a power supply control circuit for delivering power from said power supply circuit to said control device when necessitated, for driving a film advancing mechanism of said camera, wherein said motor drive device is provided with a power supply circuit capable of separate power supply to said control device;

an improvement comprising:

power supply control means operable to control said power supply by said power supply circuit; and means for driving said power supply control means in synchronization with the power supply control circuit of said camera.

24. In a motor drive device to be coupled with a camera capable of generating a film advancing signal at the final stage of film exposure operation, for driving a film advancing mechanism of said camera, said camera being provided with a switch circuit for controlling power supply from said power supply circuit wherein said motor drive device is provided with a power supply circuit for supplying electric power to said camera and with a power supply control circuit capable of controlling power supply from said power supply control in synchronization with said switch circuit and electric power for motor drive and a motor drive circuit for supplying the power from said power supply circuit to said motor in response to said film advancing signal from said camera;

an improvement comprising interrupting means for interrupting the power supply to said motor from said motor drive circuit, wherein said interrupting means comprises a timer circuit adapted to initiate time measurement in synchronization with said film advancing signal and to effect said interruption after the lapse of a determined time from said film advancing signal said interrupting means being rendered operable by the power supplied from said power supply control circuit, and further comprises means for maintaining power supply by said power supply control circuit in response to the interruption of said interrupting means and regardless of the function of said switch circuit.

* * * * *